US009516668B2

(12) United States Patent
Liu et al.

(10) Patent No.: US 9,516,668 B2
(45) Date of Patent: Dec. 6, 2016

(54) METHOD, APPARATUS AND SYSTEM FOR UPLINK RANK ADAPTATION

(75) Inventors: Jinhua Liu, Beijing (CN); Qingyu Miao, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 158 days.

(21) Appl. No.: 14/232,767

(22) PCT Filed: Jul. 16, 2012

(86) PCT No.: PCT/CN2012/078681
§ 371 (c)(1),
(2), (4) Date: Jan. 14, 2014

(87) PCT Pub. No.: WO2013/010467
PCT Pub. Date: Jan. 24, 2013

(65) Prior Publication Data
US 2014/0140313 A1 May 22, 2014

(30) Foreign Application Priority Data

Jul. 15, 2011 (CN) .......................... 2011 1 0209507

(51) Int. Cl.
*H04L 1/00* (2006.01)
*H04L 1/06* (2006.01)
(Continued)

(52) U.S. Cl.
CPC ........ *H04W 72/1268* (2013.01); *H04L 1/0002* (2013.01); *H04L 1/0033* (2013.01); *H04W 52/346* (2013.01); *H04L 1/06* (2013.01)

(58) Field of Classification Search
CPC ........ H04L 1/0033; H04L 1/06; H04L 1/0002; H04W 52/346; H04W 72/1268
See application file for complete search history.

(56) References Cited

U.S. PATENT DOCUMENTS

2005/0111397 A1* 5/2005 Attar ..................... H04W 28/18
370/319
2008/0095263 A1* 4/2008 Xu ........................ H04B 7/0689
375/295
(Continued)

FOREIGN PATENT DOCUMENTS

CN 1960199 A 5/2007
CN 101816203 A 8/2010
(Continued)

OTHER PUBLICATIONS

PCT International Preliminary Report on Patentability for PCT/CN2012/078681, Date of Issuance of Report: Jan. 21, 2014, 6 pages.
(Continued)

*Primary Examiner* — Redentor Pasia
*Assistant Examiner* — Peter Mak
(74) *Attorney, Agent, or Firm* — Nicholson de Vos Webster & Elliott LLP (57) ABSTRACT

A method, an apparatus and a system for uplink rank adaptation are provided in the present invention, wherein the method comprises: estimating the maximum supportable data rate and channel information of a user equipment in uplink transmission; comparing the maximum supportable data rate with one or more predetermined thresholds, wherein the predetermined thresholds are associated with corresponding ranks; and determining a rank used by the user equipment in the uplink transmission based on a result of the comparison and the estimated channel information. With the present invention, a base station can quickly determine a rank for uplink MIMO transmission, decrease the rank estimating error, and lower the computation complexity for estimating the rank and the subsequent precoding vector.

13 Claims, 5 Drawing Sheets

(51) Int. Cl.
   *H04W 72/12*   (2009.01)
   *H04W 52/34*   (2009.01)

(56) References Cited

U.S. PATENT DOCUMENTS

| | | |
|---|---|---|
| 2009/0181691 A1 | 7/2009 | Kotecha et al. |
| 2009/0262695 A1 | 10/2009 | Chen et al. |
| 2010/0002800 A1 | 1/2010 | Kim et al. |
| 2012/0177089 A1* | 7/2012 | Pelletier ............... H04B 7/0417 375/219 |
| 2012/0287965 A1* | 11/2012 | Sambhwani ......... H04B 7/0413 375/141 |
| 2014/0036879 A1* | 2/2014 | Pirskanen ........... H04W 52/365 370/336 |

FOREIGN PATENT DOCUMENTS

| | | |
|---|---|---|
| EP | 1 928 114 A1 | 6/2008 |
| JP | 2009-111781 A | 5/2009 |
| JP | 2011-9865 A | 1/2011 |
| JP | 2011-29743 A | 2/2011 |
| JP | 2011-504308 A | 2/2011 |
| SE | WO 2010068153 A1 * | 6/2010 ............... H04L 1/20 |
| WO | WO 2007109679 A2 * | 9/2007 ............... H04B 7/04 |
| WO | WO-2010002964 A2 | 1/2010 |

OTHER PUBLICATIONS

European Search Report and Written Opinion for Application No. PCT/CN2012/078681, mailed Jun. 11, 2015, 11 pages.
International Search Report, Application No. PCT/CN2012/078681, Sep. 27, 2012, 3 pages.
European Search Report for International Application No. PCT/CN2012/078681, mailed Mar. 17, 2015, 5 pages.
Office Action for corresponding Japan Application No. 2014-519404, mailed Aug. 17, 2015, 5 pages.
Decision of Refusal for Japan Application No. 2014-519494, mailed Jan. 29, 2016, 6 pages.
Decision to Grant a Patent for Japan Application No. 2014-519404, mailed Jun. 17, 2016, 6 pages.
First Office Action for Russian Application No. 2014105572, mailed May 31, 2016, 10 pages.

* cited by examiner

METHOD, APPARATUS AND SYSTEM FOR UPLINK RANK ADAPTATION

CROSS-REFERENCE TO RELATED APPLICATIONS

This application is a National stage of International Application No. PCT/CN2012/078681, filed Jul. 16, 2012, which claims priority to CN Application No. 201110209507.4, filed Jul. 15, 2011, which are hereby incorporated by reference.

FIELD OF THE INVENTION

The present invention generally relates to wireless communication field. More particularly, the present invention relates to a method, an apparatus and a system for uplink rank adaptation of user equipment.

BACKGROUND OF THE INVENTION

With the evolution of the High Speed Packet Access (HSPA), in the RAN#50 meeting of the 3rd Generation Partnership Project (3GPP), the close loop transmit diversity (CLTD) was proposed as a work item and the uplink Multiple-Input Multiple-Output (MIMO) was proposed as a study item. For the uplink MIMO, since a plurality of data streams (e.g. two data streams) can be transmitted simultaneously from a user equipment to a base station under good channel quality, the user equipment can obtain a notable gain from the high bit-rate transmission of the uplink. How to flexibly select or determine the number of appropriate data streams (hereinafter referred to as "streams"), e.g. how to determine whether single-stream transmission or multiple-stream transmission is to be conducted in uplink transmission, it involves an uplink rank adaptation technology.

Rank generally represents the number of independent channels for wireless communication between the user equipment and the base station in a multiple-antenna system, while rank adaptation relates to flexibly select from a plurality of ranks a rank for wireless communication between the user equipment and the base station. Taking rank 1 and rank 2 transmission of the uplink as an example, the rank 1 represents that the user equipment transmits data to the base station using a single stream, now the same data is transmitted via different antennas and thereby achieves space diversity, while the rank 2 represents that the user equipment transmits two different streams to the base station and thereby achieves space multiplexing. In addition, the rank with other numerical values may also exist, e.g. rank 4.

In the downlink MIMO of the HSPA, the rank adaptation technology involves that a base station (e.g. a serving Node-B) selects an appropriate rank for downlink MIMO transmission based on the feedback information received from the user equipment, e.g. the user equipment's preferred rank and a Channel Quality Indicator (CQI) as well as a corresponding Pre-Coding Indicator (PCI) for single-stream or multiple-stream transmission. Since enough information including the above information can be obtained at the base station, it would be easy for the base station to determine the rank for the downlink transmission.

Compared to the above case of downlink MIMO rank adaptation, in the case of uplink MIMO rank adaptation, the base station is capable of understanding better about the channel condition, but regarding the base station determining an appropriate rank and a corresponding pre-coding vector, the related information obtained from the user equipment is relatively inadequate and the frequency for obtaining the related information is relatively low. Such related information, for example, may include Uplink Power Headroom (UPH), use equipment buffer status and a transmission grant. For UPH, in the current standard specification, it is reported at a long period (e.g. once 100 ms) or based on event triggering so that the base station will not frequently receive information about UPH. For the use equipment buffer status and the transmission grant, the current user equipment does not report them to the base station. Thus, the base station cannot rapidly obtain sufficient information from the user equipment so as to accurately determine an appropriate rank, and the base station may select an incorrect rank to perform uplink MIMO transmission. Thereby, the uplink MIMO performance is deteriorated and the gain obtained by MIMO is decreased.

In addition, generally speaking, the user equipment should follow the rank determined by the base station for uplink transmission. However, due to the possibility of lacking related information of the user equipment, the rank determined by the base station cannot always be well-suited for the user equipment. Thus, in some cases, the wireless network should allow the user equipment to flexibly change the rank for uplink transmission based on the rank selected by the base station.

SUMMARY OF THE INVENTION

It is an object of the embodiments of the present invention to provide a method, apparatus and system for uplink rank adaptation, which enables a base station to quickly and accurately determine a rank for uplink MIMO transmission so that a user equipment can perform the uplink MIMO transmission on the correct rank and obtain the gain of the uplink MIMO high speed data transmission.

To achieve the above object, according to one aspect of the embodiments of the present invention, there is provided a method for uplink rank adaptation, comprising:

estimating a maximum supportable data rate and channel information of a user equipment in uplink transmission;

comparing the maximum supportable data rate with one or more predetermined thresholds, wherein the predetermined thresholds are associated with corresponding ranks; and determining a rank used by the user equipment in the uplink transmission based on a result of the comparison and the estimated channel information.

According to another aspect of the embodiments of the present invention, there is provided an apparatus for uplink rank adaptation, comprising:

an estimator configured to estimate the maximum supportable data rate and channel information of a user equipment in uplink transmission;

a comparator configured to compare the maximum supportable data rate with one or more predetermined thresholds, wherein the predetermined thresholds are associated with corresponding ranks; and a determiner configured to determine a rank used by the user equipment in the uplink transmission based on a result of the comparison and the estimated channel information.

According to a further aspect of the embodiments of the present invention, there is provided a base station comprising the apparatus for uplink rank adaptation as described above.

According to one aspect of the embodiments of the present invention, there is provided a system for uplink rank adaptation, comprising:

a base station;

a user equipment for wireless communication with the base station;

wherein the base station comprises:

an estimator configured to estimate the maximum supportable data rate and channel information of a user equipment in uplink transmission;

a comparator configured to compare the maximum supportable data rate with one or more predetermined thresholds, wherein the predetermined thresholds are associated with corresponding ranks; and a determiner configured to determine a rank used by the user equipment in the uplink transmission based on a result of the comparison and the estimated channel information;

the user equipment performing the uplink transmission based on the rank determined by the base station.

According to a further aspect of the embodiments of the present invention, there is provided a method for uplink rank adaptation, comprising:

receiving an indication from a base station, wherein the indication enables a user equipment to change a rank determined by the base station for uplink transmission; and changing the rank for the uplink transmission based on one or more predetermined thresholds.

According to the method, apparatus and system in embodiments of the present invention, the base station can quickly determine a rank for uplink multiple-antenna transmission by estimating the maximum supportable data rate of the user equipment in combination with the rank that a wireless channel can support. Since the process of estimating the rank is relatively simple, embodiments of the present invention decrease the computation complexity for estimating the rank, and since after determining the rank, an appropriate pre-coding vector can be computed and determined merely for the determined rank, and thus the computation complexity for determining the pre-coding vector is also decreased. In addition, in the preferred embodiments of the present invention, the communication information or status of the user equipment side is considered as sufficiently as possible in the process of estimating the maximum supportable data rate of the user equipment, and thus the rank estimating error is also decreased.

When the base station authorizes the user equipment to change the rank specified by the base station, embodiments of the present invention add the flexibility for selecting the uplink rank, and further improve the accuracy for selecting the rank and the link transmission gain brought whereby.

Other features and advantages of the present invention will become apparent by making references to the detailed description of embodiments of the present invention in conjunction with the accompanying drawings.

DETAILED DESCRIPTION OF EMBODIMENTS

Specific embodiments of the present invention will be described below in detail by making references to the accompanying drawings.

Figure 1:
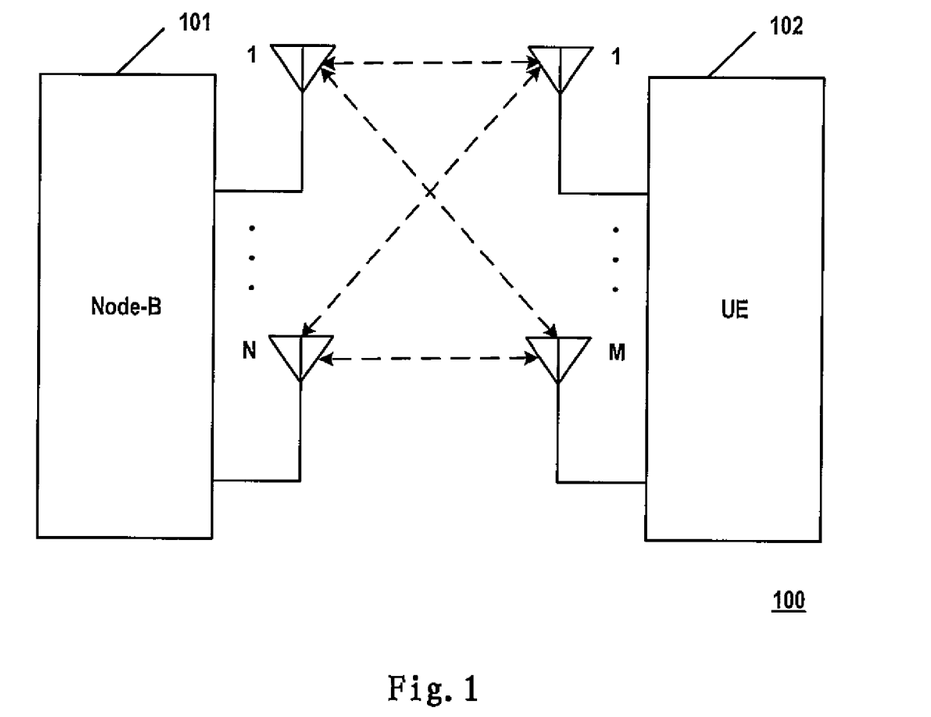
FIG. 1 is a block diagram illustrating an exemplary multiple-antenna system (e.g. MIMO system) for uplink rank adaptation that may be applied to embodiments of the present invention.

FIG. 1 is a block diagram illustrating an exemplary multiple-antenna system 100 (e.g. MIMO system) for uplink rank adaptation that may be applied to embodiments of the present invention. The multiple-antenna system 100, for example, may be applied to wireless access systems such as HSPA, CDMA 2000 and LTE, etc. As illustrated in FIG. 1, the multiple-antenna system 100 comprises Node B 101 (i.e. base station) and User Equipment (UE) 102 in wireless communication with the Node B, wherein the Node B 101 has N antennas while UE 102 has M antennas to thereby constitute a N×M MIMO system. In HSPA system, it, for example, may constitute a 2×2 MIMO system, where N and M equal to 2 indicates that the MIMO system supports single-stream or dual-stream transmission, i.e. the value of a rank may take 1 or 2 as appropriate.

Figure 5:
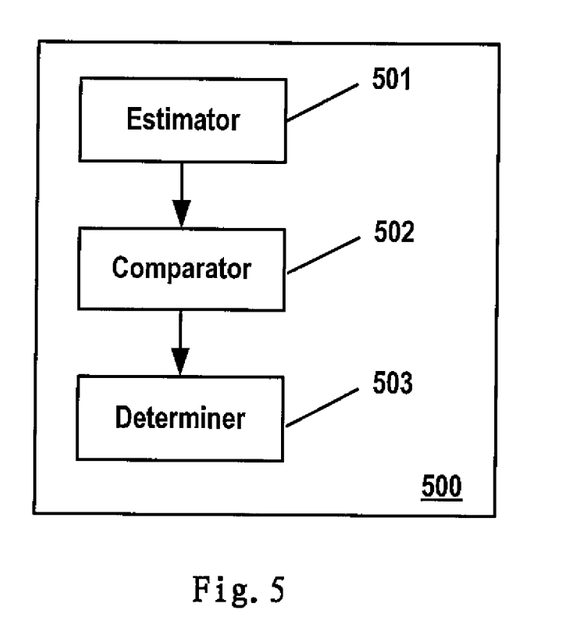
FIG. 5 is a block diagram illustrating an apparatus for uplink rank adaptation according to embodiments of the present invention.

In the illustrated multiple-antenna system 100, the Node B 101 may estimate the maximum supportable data rate and channel information of the UE 102 in uplink transmission by related information received from the UE 102, compare the maximum supportable data rate with one or more predetermined thresholds (associated with corresponding ranks), and determine the rank of the UE 102 in the uplink transmission based on the comparison result and the channel information. The above operations of the Node B 101 may be performed respectively by an estimator 501, a comparator 502 and a determiner 503 of the apparatus 500 as illustrated in FIG. 5, which will be described below in detail with reference to FIG. 5.

In one embodiment of the present invention, the related information received from the UE 102 may involve information such as the uplink power headroom, the transmit buffer status and the uplink transmission grant of the UE 102, while the channel information may be expressed by a channel matrix, which may be estimated by a base station based on the pilots and the pre-coding matrix. In another embodiment of the present invention, when the UE 102 is instructed or authorized to change the rank determined or indicated by the Node B 101, the UE 102 may, for example, change the size of the rank for the uplink transmission when a predetermined condition is met. It will be described below in detail by making references to FIGS. 2 and 4 that how the Node B 101 rapidly determines a rank adapted to be used by the UE 102 in the uplink transmission in the exemplary multiple-antenna system 100.

Figure 2:
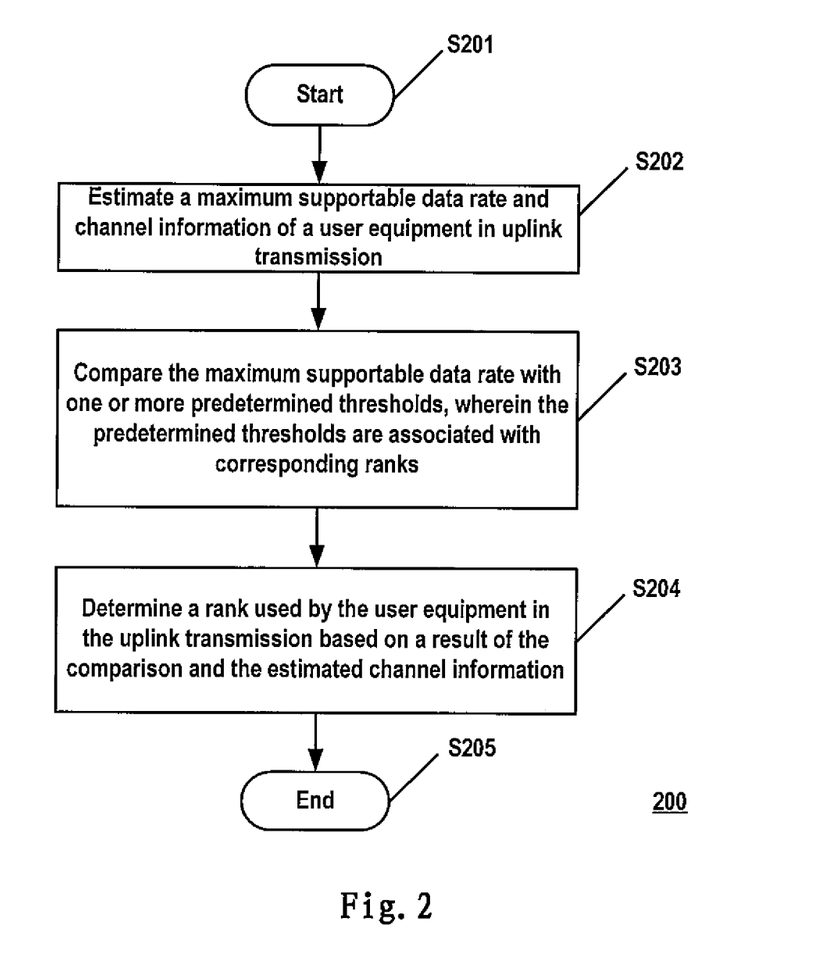
FIG. 2 is a flowchart illustrating a method for uplink rank adaptation according to embodiments of the present invention.

FIG. 2 is a flowchart illustrating a method 200 for uplink rank adaptation according to embodiments of the present invention. As illustrated in FIG. 2, the method 200 starts at step S201, and at step S202, the method 200 estimates the maximum supportable data rate and channel information of a user equipment (e.g. UE 102) in uplink transmission, wherein one example for estimating the maximum supportable data rate may involve estimating the maximum supportable data rate based on the estimation of the uplink power headroom, the transmit buffer status and the uplink transmission grant of the user equipment (how to estimate will be described below in detail by making references to FIGS. 3 and 4), and the high maximum supportable data rate requires high UPH, more buffered data and high transmission grant.

The channel information, for example, may be the channel matrix H obtained by utilizing the reference signal. Take a 2×2 multiple-antenna system as an example, the channel matrix may be expressed as below:

$$H = \begin{bmatrix} h_{11} & h_{12} \\ h_{21} & h_{22} \end{bmatrix} \quad (1)$$

Here $h_{ij}$ denotes a wireless channel between the transmit antenna i (i=1, 2) and the receive antenna j (j=1, 2). The number of supportable independent channels of the current wireless channel, i.e. the number of supportable streams can be determined by calculating the size of the rank of the channel matrix. Regarding the estimation and determination of the channel matrix, those skilled in the art may employ appropriate means to implement them. Further explanations will not be made herein for avoiding unnecessarily obscuring the present invention.

Next, the method 200 proceeds to step S203. At step S203, the method 200 compares the maximum supportable data rate with one or more predetermined thresholds, wherein the predetermined thresholds are associated with corresponding ranks. For example, a corresponding threshold is respectively set for the rank 1, 2, 3 or 4, and when the estimated maximum supportable data rate exceeds certain corresponding threshold, a rank corresponding to the threshold is selected.

At step S204, the method 200 determines a rank used by the user equipment in the uplink transmission based on a result of the comparison and the estimated channel information. When the rank determined via a predetermined threshold is different from that determined via a channel matrix, selecting a smaller rank of the two for the uplink MIMO transmission. For example, when it is determined through the comparison that the maximum supportable data rate of the user equipment is higher than the threshold predetermined for rank 1 but lower than the one determined for rank 2, and the rank of the estimated channel matrix is 2, it can be determined that it is suitable for those skilled in the art to use rank 1 for transmission in the uplink MIMO transmission, that is, the user equipment would use single stream for transmission. Again, when it is determined through the comparison that the maximum supportable data rate of the user equipment is higher than the threshold predetermined for rank 2, and the rank of the estimated channel matrix is also 2, then it can be determined that it is suitable for the use equipment to use rank 2 for transmission in the uplink MIMO transmission, that is, the user equipment will use dual streams for transmission. Finally, the method 200 ends at step S205.

With the method 200 in the above embodiments of the present invention, the process of estimating the rank becomes relatively simple and thereby decreases the computation complexity for estimating the rank. In addition, since the rank for the uplink MIMO transmission is determined, the base station will not unnecessarily try to select the preferred pre-coding vector from the codebook respectively for various possible ranks, but directly select a preferred pre-coding vector that maximizes a payload size from the codebook for the determined rank, thereby saving the complexity and overhead in the calculation aspect for determining the pre-coding vector. For example, in the above case of determining or estimating the rank as 1, the base station will no longer try the uplink transmission with the rank 2 or 3 respectively for each pre-coding vector in the codebook so as to determine an appropriate rank and a corresponding pre-coding vector after considering the rank 2 or 3.

Although it is not shown in FIG. 2, in one embodiment, the method 200 further comprises that the base station dynamically indicates that the user equipment has an authority for changing the rank, and the indication may be made via signaling, e.g. indicates that the user equipment has the authority for changing the rank via one of the Radio Resource Control (RRC) signaling, a Media Access Control (MAC) layer header, a High Speed Shared Control Channel (HS-SCCH). In another embodiment, the method 200 may inform the user equipment of one or more thresholds for determining whether to change the rank, via one of the radio resource control signaling, the media access control layer header and the high speed shared control channel, wherein the one or more thresholds may, for example, include one or more thresholds about the buffered data in the transmit buffer, the available uplink power headroom or the uplink transmission grant. With the above steps, the user equipment has the authority for changing the rank for uplink transmission and may change the rank based on one or more predetermined thresholds, and thereby further improves the accuracy for selecting the rank and the link transmission gain brought whereby.

Now, taking the rank 1 or 2 as an example to explain the case that the user equipment has an authority for changing the rank. When the base station indicates to the user equipment that the rank for the uplink transmission is 1, it will not be allowed or indicated that the user equipment has an authority for changing the rank in any case. This is because when lacking the channel information and the correct pre-coding vector selection, the user equipment changing the rank from 1 (i.e. single-stream transmission) to 2 (dual-stream transmission) will cause the received data signal-to-noise ratio to obviously decrease due to great interference between streams, since the rank of the uplink channel is not enough to support the transmission by the selected rank. Thus, the user equipment is only allowed to use the rank whose value is not higher than the value indicated by the base station for transmission so as to ensure the rank of the channel not less than the rank selected by the user as well as the uplink reliable transmission.

If the base station indicates to the user equipment that the rank for the uplink transmission is 2, the user equipment may change the rank to be 1 based on the configuration of the network. For example, on the basis that the buffered data in the transmit buffer of the user equipment is less than the threshold predetermined for rank 2, or on the basis that the available power headroom for dual-stream transmission (the rank is 2) is less than the threshold predetermined for rank 2, or on the basis that the transmission grant is less than the threshold predetermined for rank 2, the user equipment may change the rank from 2 to 1, i.e. change from the dual-stream transmission to the single-stream transmission.

In addition, the pre-coding vector to be used by the user equipment after the rank is changed may be predetermined. For example, the data stream (e.g. dual-stream) may sequentially use the pre-coding vector in the pre-coding matrix indicated by the base station, that is, the primary data stream can still use the primary pre-coding vector from the pre-coding matrix while the secondary data stream can use the secondary pre-coding vector from the pre-coding matrix.

Figure 3:
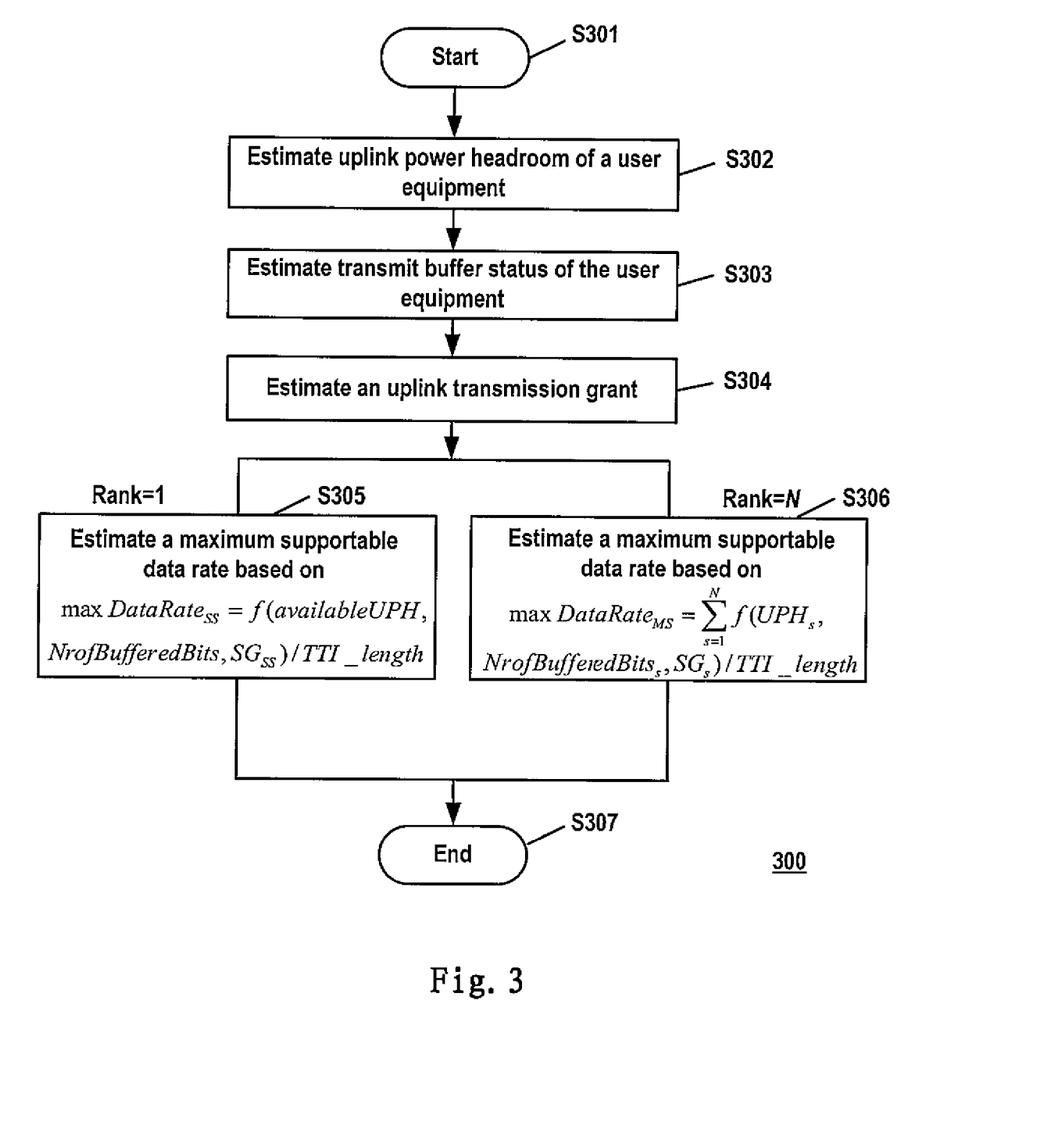
FIG. 3 is a flowchart illustrating a method for estimating a maximum supportable data rate according to an embodiment of the present invention.

FIG. 3 is a flowchart illustrating a method 300 for estimating the maximum supportable data rate according to one embodiment of the present invention. As illustrated in FIG. 3, the method 300 starts at step S301 and estimates UPH of the user equipment at step S302.

In one embodiment, the estimation of UPH of the user equipment includes the base station (or Node B) of serving user equipment estimating based on Formula (2) below:

$$availableUPH = referenceUPH + StepSize \times accumulatedTPC + \Delta \quad (2)$$

Where availableUPH is the estimated UPH; referenceUPH is the reference UPH, which is generated when the UPH is reported by the user equipment to the Node B or is measured by the serving Node B; StepSize is an inner loop power control step; accumulatedTPC is an accumulation of transmit power control commands; and $\Delta$ is the margin to compensate the estimation error of UPH.

For accumulatedTPC in the above formula, controlling the increase of the transmit power may be denoted by +1 while controlling the decrease of the transmit power may be denoted by −1, and the accumulating operation may start from the time when the reference UPH is updated (i.e. reset); accumulatedTPC is reset to be zero each time when the reference UPH is updated. In other words, accumulatedTPC is reset in response to updating the reference UPH.

For the reference UPH in the above formula, it should be updated as frequently as possible in various cases in order to minimize the estimation error of UPH. For the updating of the reference UPH, it may be updated via at least one of the following:

updating the reference UPH to be a new UPH of the report in response to the user equipment reporting a new UPH to the Node B;

updating the reference UPH to be a measured UPH in response to measuring the UPH of the user equipment. For example, when the user equipment is power limited, the Node B can measure the UPH of the user equipment based on the received power of all physical channels, and then can update the reference UPH to be the measured UPH of the Node B.

The reference UPH may be updated based on Formula (3) below:

$$TPO = \sum_{c=1}^{N} rxPower_{PCH,c} / rxPower_{R-DPCCH} \quad (3)$$

Where TPO (Transmission Power Offset) is the transmission power offset of the user equipment; N is the number of physical channels in uplink; $rxPower_{PCH,c}$ is the received power of the Cth physical channel; $rxPower_{R-DPCCH}$ is the received power of the reference Dedicated Physical Control Channel (DPCCH) of the UPH, which can be the received power of a single DPCCH or a certain combination of the received powers of certain DPCCHs. When the user equipment is detected to be power limited, the measured TPO equals the UPH. Even when the user equipment is detected to be not power limited, the reference UPH still can be updated conditionally by the above Formula (3). For example, if the transmission power offset of the user equipment measured according to Formula (3) is larger than the present estimated UPH obtained according to Formula (2), the reference UPH can be updated to be the transmission power offset of the user equipment and accumulatedTPC can be reset as 0.

Subsequent to estimating the UPH of the user equipment, the method 300 proceeds to step S303. At the step S303, the method 300 estimates the transmit buffer status of the user equipment. Although the exact uplink buffer status of a user equipment is not reported to the Node B currently, the transmit buffer status can be estimated by utilizing embodiments of the present invention according to at least one of the following: a happy bit received from the user equipment; an Enhanced Transport Format Combination Indicator (E-TFCI) received from the user equipment; or the current service type of the user equipment.

Regarding the case of receiving the happy bit from the user equipment, when the user equipment transmits a negative happy bit to the Node B, it indicates that the number of the buffered bits in the transmit buffer of the user equipment has exceeded a predetermined threshold. That is to say, the user equipment has buffered enough bits to support a higher transmit data rate in uplink. At that time, the predetermined threshold reflects the transmit buffer status of the current user equipment.

Regarding the case of receiving E-TFCI from the user equipment, the Node B can monitor the E-TFCIs transmitted from the user equipment. With the statistic characteristics of the corresponding transport block sizes, the Node B can predict whether the user equipment has enough buffered bits to support a high data rate transmission. For example, the Node B can measure the most recent uplink transmit data rate of the user equipment, and it is regarded that the buffered data of the user equipment at least can support the uplink data transmission at a rate not less than the transmission rate. For another example, if the user equipment always transmits with the maximum allowed Enhanced Transport Format Combination (E-TFC) which is identified by a high enough absolute transmission grant, the base station can similarly regard that the buffered data in the transmit buffer of the user equipment at least can support the uplink data transmission at a transmission rate not less than the absolute transmission grant. Thus, the Node B can estimate the transmit buffer status of the user equipment by determining that the data in the buffer supports the uplink transmission at a rate not less than the measured data rate.

Regarding the case of the current service type of the user equipment, since different service requires different Quality of Service (QoS), the service type is also a beneficial factor to predict the transmit buffer status of the user equipment. For example, the bit-rate of a real time service varies quickly and there is a strict delay restriction, which means that the predication of the buffer status may be based on the most recently instantaneous information. Take the real time video transmission as an example, the uplink data transmission rate that can be supported by the data in the transmit buffer of the user equipment can be estimated based on the most recent E-TFC sizes of certain TTIs, e.g. by sliding average or by utilizing the filter as illustrated in Formula (4) below:

$$Rate(n) = Rate(n-1) \times (1-\alpha) + \alpha \times TBsize/TTI\_length \quad (4)$$

Where Rate is a supportable uplink data rate; n is a sequence number of a current TTI; TBsize is a current transport block size; TTI_length is a length of a TTI; and $\alpha$ is a forgetting factor.

Next, the Node B estimates the transmit buffer status of the user equipment by determining that the data in the buffer supports the uplink transmission at a rate not less than the measured data rate.

For a File Transfer Protocol (FTP) service as another example, the user equipment usually has enough buffered bits to support high data rate transmission in uplink transmission during the time being served, i.e. can execute multiple-stream transmission. The uplink data transmission rate that can be supported by the data in the uplink transmit buffer of the FTP service can also be estimated via the above Formula (4). Similarly, the Node B correspondingly estimates the transmit buffer status of the user equipment by determining that the data in the buffer supports the uplink transmission at a rate not less than the estimated data rate.

Upon estimating the transmit buffer status of the user equipment, the method 300 proceeds to step S304. At the step S304, the method 300 estimates the uplink transmission grant.

The uplink transmission grant is another factor for limiting the maximum supportable data rate of a user equipment. For the user equipment not in soft/softer handover, the Node B serving the user equipment can exactly know the transmission grant of the user equipment. However, for a user equipment in a soft handover, the transmission grant can also be changed by a non-serving Node B. In this case, the serving Node B may not know the transmission grant of the user equipment. According to embodiments of the present invention, especially when the user equipment is in a soft/softer handover, the serving Node B can estimate the transmission grant of the user equipment based on one of the following:

when a user equipment is not power limited and it sends a negative happy bit to the serving Node B, then the most recent maximum transport block size identifies the uplink transmission grant, and thereby the uplink transmission grant of the user equipment can be estimated; or the maximum transport block size of the user equipment when it is power limited. For example, when the user equipment is power limited, the corresponding transport block size of the uplink transmission grant can be identified as larger than the maximum transport block size.

In the case that each stream in the singe-stream transmission (rank equal to 1) and multiple-stream transmission (rank greater than or equal to 2) provides a special or separate transmission grant, the estimation of the uplink transmission grant may additionally include respectively estimating the uplink transmission grant for the singe-stream transmission or multiple-stream transmission.

Since the transmission grant does not change so often as the UPH and the uplink transmit buffer status, the measurement frequency of the uplink transmission grant of the user equipment in a soft handover does not need to be as high as the UPH and the uplink transmit buffer status.

After the method 300 estimates the UPH, transmit buffer status and uplink transmission grant of the user equipment respectively at steps S302, S303, and S304, the method 300 respectively estimates the uplink maximum supportable data rate of the user equipment for the case of rank equal to 1 (i.e. single-stream transmission) and rank equal to N (i.e. N-stream transmission) at steps S305 and S306.

For the single-stream transmission of rank equal to 1, estimating the maximum supportable data rate in a Transmission Time Interval (TTI) includes an estimation according to Formula (5) below:

$$\max \text{DataRate}_{SS} = f(\text{availableUPH}, \text{NrofBufferedBits}, SG_{SS})/\text{TTI\_length} \quad (5)$$

Where max DataRate$_{SS}$ is a maximum supportable data rate in single-stream transmission; availableUPH is estimated UPH; NrofBufferedBits is a estimated number of the buffered bits in the transmit buffer (which, for example, is expressed by a supportable data rate); SG$_{SS}$ is an uplink transmission grant estimated for single-stream transmission; TTI_length is a length of a TTI; $f(\ )$ is the function that respectively maps availableUPH, NrofBufferedBits and SG$_{SS}$ to their respective maximum supportable data rates and takes the minimum value.

For the multiple-stream transmission of rank equal to N, estimating the maximum supportable data rate in a TTI includes an estimation according to Formula (6) below:

$$\max \text{DataRate}_{MS} = \sum_{s=1}^{N} f(UPH_s, \text{NrofBufferedBits}_s, SG_s)/\text{TTI\_length} \quad (6)$$

Where max DataRate$_{MS}$ is the maximum supportable data rate in multiple-stream transmission; s is the serial number of the stream; N is the number of the streams; UPH$_s$ is the uplink power headroom estimated for the sth stream; NrofBufferedBits$_s$ is the number of the buffered bits in the transmit buffer estimated for the sth stream (which, for example, is expressed by a supportable data rate); SG$_s$ is an uplink transmission grant estimated for the sth stream; TTI_length is a length of a TTI; $f(\ )$ is the function that respectively maps UPH$_s$, NrofBufferedBits$_s$ and SG$_s$ to their respective maximum supportable data rates and takes the minimum value.

Take N=2 as an example, i.e. in case of dual-stream transmission, the UPH and the buffered data are shared between two streams. The transmission grant may be shared between two streams if there is no separate transmission grant defined respectively for the two streams. Then in the above formula, UPH$_s$=UPH$_1$+UPH$_2$=availableUPH while NrofBufferedBits=NrofBufferedBits$_1$+NrofBufferedBits$_2$, where the subscripts 1 and 2 respectively denote stream 1 and stream 2.

After respectively estimating the uplink maximum supportable data rates of the user equipment for rank equal to 1 and rank equal to N at step s305 and step S306, the method 300 ends at step S307.

With the method steps as illustrated in FIG. 3, the maximum supportable data rates of the user equipment for rank equal to 1 and rank equal to N (N greater than and equal to 2) can be estimated, and thereby the operation of estimating the maximum supportable data rate at step S202 of the method 200 is achieved. Although steps S302-S304 are shown in order in FIG. 3, it does not mean that the above steps can be implemented only in the order as shown in FIG. 3, and they can also be implemented in parallel or in other orders. In addition, although it is not shown in FIG. 3, the method 300 can further estimate the maximum supportable data rate of the user equipment with reference to the limitation from the communication upper layer, and the limitation, for example, may be the IuB bandwidth limit in case of high data rate transmission. For example, if the bandwidth that the communication upper layer can provide (i.e. the maximum supportable data rate) is less than the single-stream or multiple-stream maximum supportable data rate, the maximum supportable data rate of the uplink single-stream or multiple-stream transmission equals to the bandwidth that the communication upper layer can provide.

Figure 4:
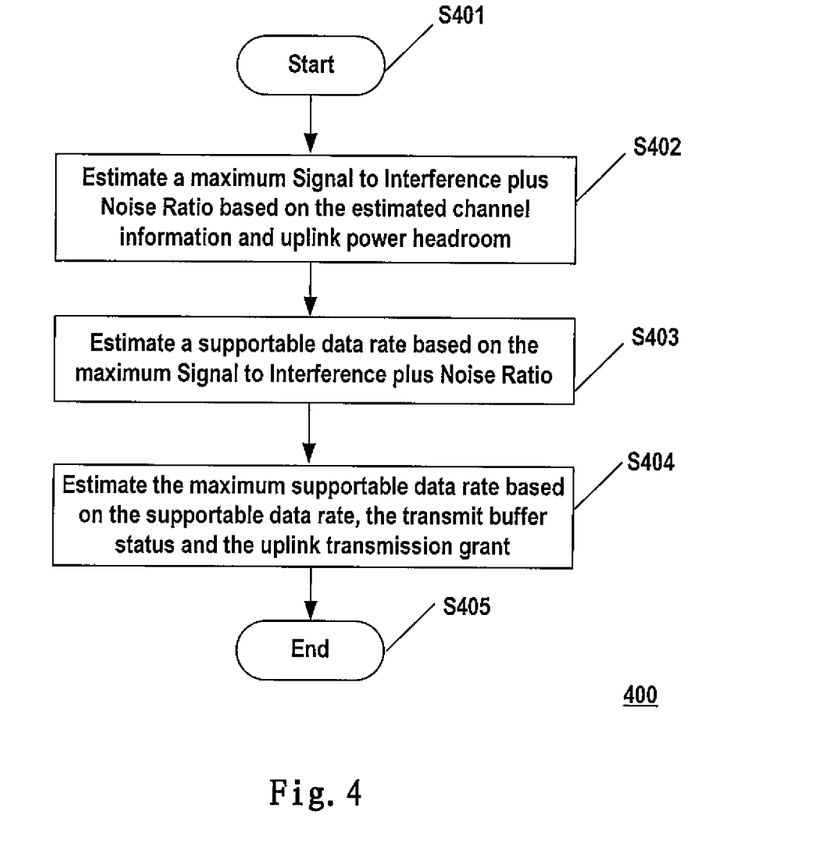
FIG. 4 is a flowchart illustrating a method for estimating a maximum supportable data rate according to another embodiment of the present invention.

FIG. 4 is a flowchart illustrating a method 400 for estimating the maximum supportable data rate according to another embodiment of the present invention. The method 400 starts at step S401, and at step S402, a maximum Signal to Interference plus Noise Ratio (SINR) is estimated based on the estimated channel information (i.e. channel matrix) and uplink power headroom, i.e. the maximum available equivalent Signal to Interference plus Noise Ratio is estimated. Next, at step S403, the method 400 estimates a supportable data rate by utilizing the maximum Signal to Interference plus Noise Ratio.

At step S404, the method 400 estimates the maximum supportable data rate based on the supportable data rate, transmit buffer status and uplink transmission grant. Specifically speaking, the data rates corresponding to the obtained supportable data rate, transmit buffer status and uplink transmission grant are compared, and when respective values are different, selecting the minimum value as the maximum supportable data rate estimated in this embodiment of the present invention. Finally, the method 400 ends at step S405. With the above steps of the method 400, the operation of estimating the maximum supportable data rate at step S202 in the method 200 can be achieved.

In the above method 400, the channel information, the uplink power headroom, the transmit buffer status and the uplink transmission grant, for example, may be implemented by employing various methods as described with reference to FIG. 3, while estimating the maximum Signal to Interference plus Noise Ratio, for example, may be calculated with Formula (7) below:

$$SINR_s = \frac{\begin{bmatrix} w_{1s} \\ w_{2s} \end{bmatrix}^H \begin{bmatrix} \sqrt{Pu_s}\,\tilde{h}_{1s} \\ \sqrt{Pu_s}\,\tilde{h}_{2s} \end{bmatrix} \begin{bmatrix} \sqrt{Pu_s}\,\tilde{h}_{1s} \\ \sqrt{Pu_s}\,\tilde{h}_{2s} \end{bmatrix}^H \begin{bmatrix} w_{1s} \\ w_{2s} \end{bmatrix}}{\begin{bmatrix} w_{1s} \\ w_{2s} \end{bmatrix}^H Ru_s \begin{bmatrix} w_{1s} \\ w_{2s} \end{bmatrix}} \quad (7)$$

where s is a serial number of the stream; $Pu_s$ is transmit power of the stream s (which can be obtained via the uplink power headroom); Ru is a noise and interference covariance matrix; $\tilde{h}$ is an equivalent channel matrix; numbers 1 and 2 are the serial numbers of the receive antennas; W is the weighted weight estimated by the receiver.

where the noise and interference covariance matrix $Ru_s$ may be calculated with Formula (8) below:

$$Ru_s = \frac{1}{SF}\left(R - \sum_{s'=1}^{2} Pu_{s'}\begin{bmatrix} \tilde{h}_{1s'} \\ \tilde{h}_{2s'} \end{bmatrix}\begin{bmatrix} \tilde{h}_{1s'} \\ \tilde{h}_{2s'} \end{bmatrix}^H + \sum_{s'=1, s' \neq s}^{2} SF \cdot Pu_{s'}\begin{bmatrix} \tilde{h}_{1s'} \\ \tilde{h}_{2s'} \end{bmatrix}\begin{bmatrix} \tilde{h}_{1s'} \\ \tilde{h}_{2s'} \end{bmatrix}^H\right) \quad (8)$$

where s and s' are the serial numbers of the streams; SF is a spreading factor; R is an autocorrelative matrix of the receive signal.

Regarding using the maximum Signal to Interference plus Noise Ratio to estimate the supportable data rate, in one embodiment, the supportable data rate can be estimated by the Signal to Interference plus Noise Ratio and the Shannon formula. In another embodiment, the supportable data rate can be estimated by the Signal to Interference plus Noise Ratio and the E-TFC selection look-up table. For example, the Signal to Interference plus Noise Ratio required by each transport format in the E-TFC table can be estimated in advance according to the predetermined Block Error Rate (BLER) target, and then the current available maximum Signal to Interference plus Noise Ratio is estimated based on Formula (7). For each transmission rank that may be selected, the Signal to Interference plus Noise Ratio is allocated to each stream according to certain rules (e.g. an equal division manner), and then the maximum transport format of each stream can be obtained by looking up the table, and further the supportable rate can be obtained if using the rank for data transmission.

FIG. 5 is a block diagram illustrating an apparatus 500 for uplink rank adaptation according to embodiments of the present invention. As illustrated in FIG. 5, the apparatus 500 comprises an estimator 501, a comparator 502 and a determiner 503, wherein the estimator 501 is configured to estimate the maximum supportable data rate and the channel information of a user equipment in uplink transmission; the comparator 502 is configured to compare the maximum supportable data rate with one or more predetermined thresholds, wherein the predetermined thresholds are associated with corresponding ranks; the determiner 503 is configured to determine a rank used by the user equipment in the uplink transmission based on a result of the comparison and the estimated channel information. In one embodiment, the apparatus 500 may be implemented as a base station or implemented in a base station, e.g. the Node B 101 of the multiple-antenna system as illustrated in FIG. 1.

In one embodiment of the present invention, the estimator 501 is configured to estimate the maximum supportable data rate based on the estimation of the uplink power headroom, transmit buffer status and uplink transmission grant of a user equipment.

In another embodiment of the present invention, the estimator 501 is configured to estimate the maximum supportable data rate with Formula (5) for single-stream transmission. In a further embodiment of the present invention, the estimator 501 is configured to estimate the maximum supportable data rate with Formula (6) for multiple-stream transmission.

In one embodiment of the present invention, the estimator 501 is configured to estimate the maximum Signal to Interference plus Noise Ratio based on the estimated channel information and uplink power headroom, to estimate the supportable data rate utilizing the maximum Signal to Interference plus Noise Ratio, and to estimate the maximum supportable data rate based on the supportable data rate, transmit buffer status and uplink transmission grant. That is, the estimator 501 can be used to implement respective steps of the method 400.

Embodiments of the present invention are described above with reference to the accompanying drawings. It should be noted that to facilitate the understanding of the present invention, some more specific technical details that are well-known to those skilled in the art and may be necessary for implementing the present invention are omitted in the above descriptions.

The present invention may employ a form of complete hardware embodiments, complete software embodiments, or both. In a preferred embodiment, the present invention is implemented as software, including, without limitation to, firmware, resident software, micro-code, etc.

The specification of the present invention is provided for explanation and description purposes, rather than exhausting or limiting the present invention as the disclosed form. For those of ordinary skill in the art, many modifications and changes are available.

Therefore, selecting and describing the embodiments is to better explain the principle and the actual application of the present invention, and to enable those of ordinary skill in the art to understand that, without departure from the essence of the present invention, all modifications and changes fall into the protection scope of the present invention defined by the claims.

What is claimed is:

1. A method for uplink rank adaptation, comprising:
    estimating a maximum supportable data rate and channel information of a user equipment in uplink transmission, wherein the maximum supportable data rate is estimated based on an estimation of uplink power headroom, transmit buffer status and an uplink transmission grant received from the user equipment;
    comparing the maximum supportable data rate with one or more predetermined thresholds, wherein the predetermined thresholds are associated with corresponding ranks;
    determining a rank used by the user equipment in the uplink transmission based on a result of the comparison and the estimated channel information; and
    using the rank for wireless communication of the user equipment in the uplink transmission, wherein the estimation of uplink power headroom is based on a reference uplink power headroom, which is updated by a base station;
    in response to measuring the uplink power headroom of the user equipment, updating the reference uplink power headroom based on a formula below:

$$TPO = \sum_{c=1}^{N} rxPower_{PCH,c} / rxPower_{R\text{-}DPCCH}$$

where TPO is a transmission power offset of a user equipment; N is a number of physical channels in the uplink; $rxPower_{PCH,c}$ is received power of the Cth physical channel; and $rxPower_{R\text{-}DPCCH}$ is received power of a reference dedicated physical control channel of the uplink power headroom.

2. The method according to claim 1, wherein estimating the uplink power headroom of the user equipment comprises estimating based on a formula below:

availableUPH=referenceUPH+StepSize×accumulatedTPC+Δ where availableUPH is estimated uplink power headroom; referenceUPH is reference uplink power headroom; StepSize is an inner loop power control step size; accumulatedTPC is an accumulation of transmit power control commands; and Δ is a margin to compensate an estimation error of the uplink power headroom.

3. The method according to claim 1, wherein estimating the transmit buffer status comprises estimating based on at least one of the following:
    a happy bit received from the user equipment;
    an enhanced transport format combination indicator received from the user equipment; and
    a current service type of the user equipment.

4. The method according to claim 1, wherein estimating the uplink transmission grant comprises, in response to the user equipment being in a soft handover, estimating based on at least one of the following:
    a maximum transport block size when the user equipment is not power limited and it sends a negative happy bit; or
    a maximum transport block size when the user equipment is power limited.

5. The method according to claim 1, wherein estimating the maximum supportable data rate comprises estimating the maximum supportable data rate for single-stream transmission based on a formula below:

max DataRate$_{SS}$=ƒ(availableUPH,NrofBufferedBits, SG$_{SS}$)/TTI_length where max DataRate$_{SS}$ is the maximum supportable data rate in the single-stream transmission; availableUPH is the estimated uplink power headroom; NrofBufferedBits is an estimated number of buffered bits in the transmit buffer; SG$_{SS}$ is an uplink transmission grant estimated for signal-stream transmission; TTI_length is a length of a transmission time interval; ƒ( ) is a function that respectively maps availableUPH, NrofBufferedBits and SG$_{SS}$ to their respective maximum supportable data rates and takes the minimum value.

6. The method according to claim 1, wherein estimating the maximum supportable data rate comprises estimating the maximum supportable data rate for multiple-stream transmission based on a formula below:

$$\max DataRate_{MS} = \sum_{s=1}^{N} f(UPH_s, NrofBufferedBits_s, SG_s)/\text{TTI\_length}$$

where max DataRate$_{MS}$ is the maximum supportable data rate in the multiple-stream transmission; s is a serial number of a stream; N is a number of streams; UPH$_s$ is uplink power headroom estimated for the sth stream; NrofBufferedBits$_s$ is a number of buffered bits in the transmit buffer estimated for the sth stream; SG$_s$ is an uplink transmission grant estimated for the sth stream; TTI_length is a length of a transmission time interval; ƒ( ) is a function that respectively maps UPH$_s$, NrofBufferedBits$_s$ and SG$_s$ to their respective maximum supportable data rates and takes the minimum value.

7. The method according to claim 1, wherein estimating the maximum supportable data rate further comprises:
    estimating a maximum Signal to Interference plus Noise Ratio based on the estimated channel information and the uplink power headroom;
    estimating a supportable data rate based on the maximum Signal to Interference plus Noise Ratio; and
    estimating the maximum supportable data rate based on the supportable data rate, the transmit buffer status and the uplink transmission grant.

8. The method according to claim 1, further comprising dynamically indicating the user equipment that the rank can be changed.

9. The method according to claim 1, wherein determining the rank used by the user equipment in the uplink transmission comprises:
    selecting a smaller rank from a first rank determined based on the result of the comparison and a second rank determined based on the estimated channel information as the rank to be used by the user equipment in the uplink transmission.

10. An apparatus for uplink rank adaptation, comprising:
    an estimator configured to estimate a maximum supportable data rate and channel information of a user equipment in uplink transmission, wherein the maximum supportable data rate is to be estimated based on an estimation of uplink power headroom, transmit buffer status and an uplink transmission grant received from the user equipment, the estimation of the maximum supportable data rate for multiple-stream transmission being based on a formula below:

$$\mathrm{max}DataRate_{MS} = \sum_{s=1}^{N} f(UPH_s, NrofBufferedBits_s, SG_s)/\mathrm{TTI\_length}$$

where max DataRate$_{MS}$ is the maximum supportable data rate in the multiple-stream transmission; s is a serial number of a stream; N is a number of streams; UPH$_s$ is uplink power headroom estimated for the sth stream; NrofBufferedBits$_s$ is the number of buffered bits in the transmit buffer estimated for the sth stream; SG$_s$ is an uplink transmission grant estimated for the sth stream; TTI_length is a length of a transmission time interval; and $f(\ )$ is a function that respectively maps UPH$_s$, NrofBufferedBits$_s$ and SG$_s$ to their respective maximum supportable data rates and takes the minimum value;

a comparator configured to compare the maximum supportable data rate with one or more predetermined thresholds, wherein the predetermined thresholds are associated with corresponding ranks; and a determiner configured to determine a rank used by the user equipment in the uplink transmission based on a result of the comparison and the estimated channel information, wherein the rank is used for wireless communication of the user equipment in the uplink transmission.

11. The apparatus according to claim 10, wherein the estimator is configured to estimate the maximum supportable data rate for single-stream transmission based on a formula below:

max DataRate$_{SS}$=$f$(availableUPH,NrofBufferedBits, SG$_{SS}$)/TTI_length where max DataRate$_{SS}$ is the maximum supportable data rate in the single-stream transmission; availableUPH is the estimated uplink power headroom; NrofBufferedBits is an estimated number of buffered bits in the transmit buffer; SG$_{SS}$ is an uplink transmission grant estimated for signal-stream transmission; TTI_length is a length of a transmission time interval; and $f(\ )$ is a function that respectively maps availableUPH, NrofBufferedBits and SG$_{SS}$ to their respective maximum supportable data rates and takes the minimum value.

12. The apparatus according to claim 10, wherein the estimator is configured to:

estimate a maximum Signal to Interference plus Noise Ratio based on the estimated channel information and the uplink power headroom;

estimate a supportable data rate based on the maximum Signal to Interference plus Noise Ratio; and estimate the maximum supportable data rate based on the supportable data rate, the transmit buffer status and the uplink transmission grant.

13. The apparatus according to claim 10, wherein the apparatus is a base station.

* * * * *